United States Patent [19]

Collart et al.

[11] Patent Number: 4,691,000

[45] Date of Patent: Sep. 1, 1987

[54] OXYMETHYLENE COPOLYMERS AND PROCESS FOR THEIR PREPARATION

[75] Inventors: André Collart, Rixensart; Fredy Declerck, Grimbergen, both of Belgium

[73] Assignee: Solvay & Cie. (Société Anonyme), Brussels, Belgium

[21] Appl. No.: 850,550

[22] Filed: Apr. 11, 1986

[30] Foreign Application Priority Data

Apr. 15, 1985 [FR] France ............................... 85 05756

[51] Int. Cl.[4] ..................... C08G 10/02; C08G 79/02
[52] U.S. Cl. ................................. 528/244; 528/241; 528/249; 528/250
[58] Field of Search ................ 528/244, 249, 250, 241

[56] References Cited

U.S. PATENT DOCUMENTS

| | | | |
|---|---|---|---|
| 2,828,287 | 3/1958 | Cairns et al. | 528/244 |
| 3,072,609 | 1/1963 | Berardinelli et al. | 528/249 |
| 3,397,181 | 8/1968 | Halek et al. | 528/249 |
| 3,419,531 | 12/1968 | Trischler | 528/244 |
| 3,442,865 | 5/1969 | Weissermel et al. | 528/244 |

FOREIGN PATENT DOCUMENTS

1221148 5/1960 France.
1477133 4/1967 France.

*Primary Examiner*—Lucille M. Phynes
*Attorney, Agent, or Firm*—Spencer & Frank

[57] ABSTRACT

Copolymers containing oxymethylene and 2-fluoromethoxyethylene repeat units. These copolymers, of improved heat stability, may be prepared by copolymerizing trioxane with a derivative of a cyclic ether whose molecule contains at least two adjacent carbon atoms and in which an oxymethylene group carries a fluoromethyl substituent, especially epifluorohydrin.

20 Claims, No Drawings

OXYMETHYLENE COPOLYMERS AND PROCESS FOR THEIR PREPARATION

BACKGROUND OF THE INVENTION

1. Field of the Invention

The present invention relates to oxymethylene copolymers. It relates more particularly to copolymers containing oxymethylene repeat units with improved heat stability. It also relates to a process for the preparation of these copolymers.

2. Background of the Art

Polyoxymethylenes or polyacetals containing chains of —$CH_2O$— repeat units have been known for many years. They can be manufactured by the polymerization of anhydrous formaldehyde or of its cyclic trimer, trioxane.

High molecular weight homopolymers of polyoxymethylene generally have very good mechanical properties, a wide range of service temperatures, and good resistance to chemical agents, which make them a material of choice for the manufacture of moulded articles which find applications in the fields of precision engineering, the automotive industry, the electrical industry and domestic electrical appliances. However, these homopolymers are characterized by a relative instability to heat, which rsults in their decomposition with the formation of formaldehyde, when they are exposed to high temperatures for prolonged periods, especially during their fabrication.

Attempts have already been made to overcome this disadvantage by manufacturing modified polyoxymethylenes containing other oxyalkylene groups in combination with the oxymethylene groups. Such modified polyoxymethylenes, whose heat stability is higher than that of the corresponding homopolymer, have been obtained by copolymerizing trioxane with other cyclic ethers such as, for example, ethylene oxide, dioxane and dioxolane (French Pat. No. 1,221,148 to Celanese Corp.).

Copolymers with high heat stability, containing oxymethylene and 2-chloromethoxyethylene repeat units have also been prepared by copolymerization of trioxane with a comonomer chosen from epichlorohydrin and 4-chloromethyl-1,3-dioxolane (U.S. Pat. No. 3,072,609).

SUMMARY OF THE INVENTION

The present invention is aimed at providing new copolymers with still further improved heat stability.

To this end, the invention relates to copolymers containing oxymethylene repeat units and 2-fluoromethoxyethylene repeat units.

The new copolymers according to the invention contain oxymethylene repeat units (—$CH_2O$—) (referred to as groups (A) hereinafter) and 2-fluoromethoxyethylene repeat units

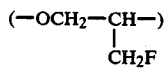

(referred to as groups (B) hereinafter).

The molar proportion of groups (B) present in the copolymers according to the invention is generally between 0.05 and 20%, preferably between 0.1 and 10 mol%.

In addition to groups (A) and groups (B), the copolymers according to the invention may contain other structural repeat units, especially oxyalkylene repeat units containing at least two carbon atoms (called groups (C) hereinafter), such as, for example, oxyethylene groups (—$OCH_2$—$CH_2$—). These units may be included in the copolymer by adding to the reaction mixture, which leads, according to the process of preparation described hereinafter, to copolymers containing both groups (A) and (B), a termonomer which is a cyclic ether whose molecule contains at least two adjacent carbon atoms, such as ethylene oxide, 1,3-dioxane and 1,3,6-trioxocane, for example.

When groups (C) are included in the copolymers according to the invention, their molar proportion therein is generally between 0.05 and 20 mol%, and the cumulative molar proportions of groups (B) and of groups (C) in the copolymer generally does not exceed 30 mol%.

Results which are excellent from the standpoint of heat stability have been recorded with copolymers consisting substantially of 99.5 to 95 mol% of groups (A) and 0.5 to 5% of groups (B). These copolymers are characterized by a remarkably uniform distribution of groups (B) along the macromolecular chains, this distribution being advantageous to their mechanical properties.

The average molecular weights of the copolymers according to the invention are assessed from their inherent viscosity ($\eta$) values, measured at 60° C. in p-chlorophenol containing 2% by weight of $\alpha$-pinene; these values are generally between 0.5 and 8 dl/g and preferably between 1.5 and 5 dl/g.

The heat stability of the copolymers according to the invention is assessed from the more or less thermally sensitive nature of the ends of these macromolecular chains and is known to the specialists by the name of "base stability". The determination of this "base stability" may be carried out as described, for example, in U.S. Pat. No. 4,035,338 to UBE Industries Ltd., column 6, lines 15 to 35. This determination involves the addition of a 10 g sample of the copolymer to 100 ml of a benzyl alcohol solution containing 1% by volume of tri-n-butylamine, heating the mixture for 2 hours at 160° C., cooling and separating the precipitated copolymer. The relationship between the weight of the copolymer recovered after washing with acetone and the weight of the copolymer added, expressed in %, represents the "base stability" of the said copolymer.

It has been found, surprisingly, that the "base stability" of the copolymers according to the invention is greater than that of the comparable copolymers of the prior art containing the same proportions of oxymethylene and 2-chloromethoxyethylene repeat units.

The invention also relates to a process for the preparation of oxymethylene copolymers by copolymerization of trioxane with an appropriate quantity of at least one comonomer chosen from the derivatives of cyclic ethers whose molecule contains at least two adjacent carbon atoms and in which an oxymethylene group carries a fluoromethyl substituent.

Among the comonomers corresponding to this definition there may be mentioned epifluorohydrin and 4-fluoromethyl-1,3-dioxolane, the comonomer which is particularly preferred being epifluorohydrin.

The copolymerization is carried out, in a known manner, in the presence of a catalyst based on a coordination complex of boron fluoride with an organic oxygen compound containing an electron-donating atom such as oxygen or sulphur. Alcohols, phenols, ethers, acids, acid anhydrides, esters, ketones, aldehydes, dialkyl sulphides and mercaptans may be mentioned as organic oxygen compounds which can be used to produce the coordination complex with boron fluoride. The preferred catalysts are boron fluoride etherates, especially the coordination complexes of boron trifluoride with diethyl ether.

In general, the catalyst is present in the copolymerization medium in a concentration such that the content of boron fluoride is between 0.001 and approximately 1% by weight, preferably between approximately 0.003 and approximately 0.1% by weight, relative to the weight of trioxane present in this medium.

Trioxane and the selected comonomer(s) are generally introduced into the copolymerization medium in a form which is as anhydrous and as pure as possible, and this makes it possible to produce copolymers of a high average molecular weight in a better yield.

The copolymerization may be carried out in the absense or in the presence of an anhydrous organic solvent which is unreactive towards the monomers.

When the copolymerization is carried out in the absence of organic solvent, this is done in most cases in molten trioxane in which the comonomer(s) and the catalyst have been dissolved. Preferably, however, the copolymerization is carried out in the presence of an organic solvent in which the trioxane is at least partially soluble. This organic solvent is generally chosen from aliphatic, alicyclic and aromatic hydrocarbons.

Alkanes such as n-hexane, n-heptane, n-octane, n-nonane, their isomers and their mixtures may be mentioned as examples of aliphatic hydrocarbons.

Cycloalkanes such as cyclohexane may be mentioned as examples of alicyclic hydrocarbons.

Benzene and its substituted derivatives such as toluene and the xylenes may be mentioned as examples of aromatic hydrocarbons.

In general, it is preferable to carry out the copolymerization in the presence of an alkane or a mixture of alkanes containing from 7 to 9 carbon atoms which, under certain conditions of concentration and of temperature, form a two-phase mixture, in which the less dense phase consists essentially of the alkane containing a little trioxane and in which the dense phase, which is the preferential site of polymerization, is very rich in trioxane.

The copolymerization is generally carried out at a temperature between 0° and 100° C., preferably between 30° and 80° C., for a period which is generally between approximately 5 minutes and approximately 48 hours, and preferably between 30 minutes and 20 hours.

When the copolymerization is carried out in the presence of an organic solvent such as mentioned earlier, the initial concentration of trioxane in the medium is generally between 0.5 and 200% by weight relative to the weight of the solvent, preferably between 10 and 150% by weight. The initial concentration of comonomer in the medium is determined as a function of the proportion in which it is to be included in the final copolymer.

This concentration may be adjusted by taking into account the reactivity of the selected comonomer and its proportion included in the copolymer, which are determined by preliminary routine tests. In general, this concentration of comonomer is between 0.1 and 50 mol% preferably between 0.2 and 20 mol%, based on the trioxane present in this medium.

When it is intended, additionally, to include groups (C) as defined earlier, in the copolymers according to the invention, in the proportions mentioned, the polymerization medium should also additionally contain the corresponding termonomer in an appropriate concentration, determined in the same manner as for the above-mentioned comonomer.

At the end of the copolymerization stage as such, an agent which neutralizes the catalyst activity is generally added to the polymerization medium; aliphatic amines such as, for example, tributylamine may be mentioned as such an agent. The copolymer obtained is then generally subjected to a hydrolysis the purpose of which is to decompose the ends of the macromolecular chains bearing thermally-unstable hydroxyl end groups. This hydrolysis may be carried out in an organic medium, of the same kind, for example, as the polymerization medium; the hydrolysis medium can thus be the polymerization medium itself. This hydrolysis is generally carried out by means of water, optionally containing an organic or inorganic compound of a basic nature such as ammonium hydroxide and alkali metal or alkaline-earth metal hydroxides, amines, ureas, alcohols, and the like, which are added to the said mediums. A detailed description of suitable methods of hydrolysis is given, for example, in U.S. Pat. No. 3,225,005 to Hoechst.

The copolymer obtained, isolated from the medium in which it has been prepared or, if appropriate, hydrolysed, is generally washed and dried. The heat stability of oxymethylene copolymers is remarkably high; it is, particularly and astonishingly, markedly higher than that of the comparable copolymers containing oxymethylene and 2-chloromethoxyethylene repeat units.

DESCRIPTION OF THE PREFERRED EMBODIMENTS

The invention is illustrated, but not limited, by the following examples.

EXAMPLES 1, 2R AND 3R (Examples 2R and 3R are given by way of comparison).

The following are introduced into a 5-l round flask:

985 g of trioxane purified by crystallization from its solution in the organic solvent ($C_{7-9}$ paraffin cut marketed by Esso under the name Isopar E) which has been used to extract it from its aqueous synthesis medium;

a comonomer, distilled and dried over a molecular sieve, whose nature and the quantity used are given in detail in the following table;

1,000 g of Isopar E;

0.125 g of a catalyst which is a coordination complex of boron fluoride with diethyl ether, diluted in approximately 5 g of hexane.

The polymerization is then carried out for 2 hours at 60° C. At the end of this period, the catalyst is killed by injecting tributylamine in a tributylamine/catalyst mol ratio of 5. Lastly, water is added to the polymerization medium in a proportion of 2 volumes per volume of Isopar E and the mixture is heated to 155° C. for one hour.

The copolymer obtained is isolated from its medium and dried in a conventional manner.

The specific conditions of the tests and their results are shown in the table below.

TABLE

| Example | 1 | 2R | 3R |
|---|---|---|---|
| Nature of the comonomer | Epifluorohydrin | Ethylene oxide | Epichlorohydrin |
| Quantity of comonomer used (% by weight relative to trioxane) | 4.1 | 4 | 5 |
| Inherent viscosity ($\eta$) of the copolymer obtained (dl/g) | 2.4 | 3.2 | 2.5 |
| Copolymer content in the comonomer (mol % based on trioxane) | 1.1 | 1.9 | 2.4 |
| "Base stability" (%) | 93.6 | 89 | 92 |

These examples show, therefore, that the copolymers according to the invention (Example 1) are characterized by a "base stability" which is greater than that of the copolymers of the prior art (Examples 2R and 3R), even in the case where the molar content of comonomer in the former is markedly lower.

What is claimed is:

1. Copolymers containing oxymethylene repeating units having the formula

and 2-fluoromethoxyethylene repeating units having the formula

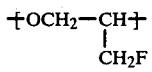

2. Copolymers according to claim 1, containing 0.05 and 20 mole % of 2-fluoromethoxyethylene repeating units.

3. Copolymers according to claim 1, additionally containing oxyalkylene repeating units containing at least two carbon atoms.

4. Copolymers according to claim 3, characterized in that the oxyalkylene repeating units are oxyethylene repeating units.

5. Copolymers according to claim 1, consisting essentially of from 99.5 to 95 mole % of oxymethylene repeating units and from 0.5 to 5 mole % of 2-fluoromethoxyethylene repeating units.

6. Process for the preparation of copolymers containing oxymethylene repeating units having the formula

and 2-fluoromethoxyethylene repeating units having the formula

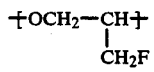

characterized in that trioxane is copolymerized with at least one comonomer chosen from derivatives of cyclic ethers whose molecule contains at least two adjacent carbon atoms and in which an oxymethylene group carries a fluoromethyl substituent.

7. Process for the preparation of copolymers according to claim 6, characterized in that the comonomer is epifluorohydrin.

8. Process for the preparation of copolymers according to claim 6, characterized in that the concentration of the comonomer in the copolymerization medium is between 0.1 and 50 mole % relative to the trioxane present in this medium.

9. Process for the preparation of copolymers according to claim 7, characterized in that the concentration of the comonomer in the copolymerization medium is between 0.1 and 50 mole % relative to the trioxane present in this medium.

10. A copolymer containing oxymethylene repeating units having the formula

and 2-fluoromethoxyethylene repeating units having the formula

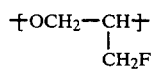

and prepared by a process comprising:
providing trioxane as the source of the oxymethylene repeating units and at least one comonomer as the source of the 2-fluoromethoxyethylene repeating units and chosen from derivatives of cyclic ethers whose molecule contains at least two adjacent carbon atoms and in which an oxymethylene group carries a fluoromethyl substituent;
mixing the trioxane and the at least one comonomer under conditions of temperature and pressure effective to cause copolymerization thereof; and
recovering the copolymer.

11. The copolymer according to claim 10, consisting essentially of from 80 to 99.95 mole % oxymethylene repeating units and from 0.05 to 20 mole % 2-fluoromethoxyethylene repeating units.

12. The copolymer according to claim 11, wherein mixing takes place in the presence of a catalyst, which catalyst is a coordination complex of boron fluoride and an organic oxygen-containing compound having an electron-donating atom.

13. The copolymer according to claim 11, wherein the at least one comonomer is epifluorohydrin.

14. The copolymer according to claim 10, consisting essentially of from 70 to 99.90 mole % oxymethylene repeating units, from 0.05 to 20 mole % 2-fluoromethoxyethylene repeating units, and from 0.05 to 20 mole % oxyalkylene repeating units, wherein the oxyalkylene repeating units are provided by a termonomer which is a cyclic ether whose molecule contains at least two adjacent carbon atoms, which termonomer is mixed with the trioxane and the at least one comonomer and copolymerized therewith.

15. The copolymer according to claim 14, wherein mixing takes place in the presence of a catalyst, which catalyst is a coordination complex of boron fluoride and an organic oxygen-containing compound having an electron-donating atom.

16. The copolymer according to claim 14, wherein the at least one comonomer is epifluorohydrin.

17. The copolymer according to claim 14, wherein the oxyalkylene repeating unit is an oxyethylene group having the formula $$\mathrm{-(OCH_2CH_2)-}.$$

18. Copolymers according to claim 1, consisting essentially of from 80 to 99.95 mole % oxymethylene repeating units, and from 0.05 to 20 mole % 2-fluoromethoxyethylene repeating units.

19. Copolymers according to claim 3, consisting essentially of from 70 to 99.90 mole % oxymethylene repeating units, from 0.05 to 20 mole % 2-fluoromethoxyethylene repeating units, and from 0.05 to 20 mole % oxyalkylene repeating units.

20. Process according to claim 6, wherein the copolymers to be prepared additionally contain oxyalkylene repeating units.

* * * * *